United States Patent [19]

Gluck

[11] Patent Number: 5,513,990

[45] Date of Patent: May 7, 1996

[54] REALISTIC MOTION RIDE SIMULATOR

[76] Inventor: Lewis Gluck, 14 Fox Run, Wappingers Falls, N.Y. 12590

[21] Appl. No.: 335,037

[22] Filed: Nov. 7, 1994

[51] Int. Cl.⁶ ............................................. G09B 9/00
[52] U.S. Cl. .......................... 434/58; 434/29; 434/55; 434/59; 472/59; 472/60
[58] Field of Search .................. 472/57, 59, 60, 472/61, 135, 137, 130; 434/29, 30, 34, 35, 37, 38, 55, 58, 61

[56] References Cited

U.S. PATENT DOCUMENTS

| | | | |
|---|---|---|---|
| 4,978,300 | 12/1990 | Letovsky et al. | 434/61 |
| 5,176,518 | 1/1993 | Hordijk et al. | 434/58 X |
| 5,366,375 | 11/1994 | Sarnicola | 434/58 X |
| 5,433,670 | 7/1995 | Trumbull | 472/60 |

*Primary Examiner*—Richard J. Apley
*Assistant Examiner*—Glenn E. Richman
*Attorney, Agent, or Firm*—Martin J. Spellman, Jr.

[57] ABSTRACT

A ride motion simulator comprising a first lower tier carried on at least three retractable and extensible legs secured to a base platform, the lower tier having support arms at edges thereof extending upwardly and outwardly a length approximately equal to the length which said legs may be extended. The upper ends of the arms are pivotally attached to upper ends of the legs. A middle tier is carried on the first tier and mounted thereto in a manner to allow forward and backward longitudinal motion of said second tier with respect to the first tier by a ram mounted at the rear of the first tier, and pivotally connected to the second tier. The second tier includes a plurality of seat supports. The seat supports have a rail running laterally on the tops. The tops also having an actuator mounted thereon with extensible and retractable rams secured to the seats mounted on the base and capable of moving the seats left and right laterally. The motions of the second, and third tiers are actuable independently of each other. The first tier is moveable up and down, pitchable up and down, and tiltable right and left, and combinations thereof.

1 Claim, 13 Drawing Sheets

REALISTIC MOTION RIDE SIMULATOR

BACKGROUND OF THE INVENTION

1. Field of the Invention

This invention relates to simulated ride experiences generally in association with large screen film projections. This rapidly expanding field generally has utilized adaptations of aircraft flight simulator technology to amusement type of rides.

The passenger or riders have a passive role. They are in it "along for the ride."

There are known systems to program the motion of simulator platforms in relationship with image(s) projected on a visual display. In this case the complex control feedback usually necessary to actively link the pilot to the simulator and film display is eliminated.

The present invention adapts each of the foregoing designs into a greatly improved complex hybrid motion based design.

2. Prior Art

In the present design one or more seat units are provided on a platform. The seats are generally constructed of high strength composite material and may be moved left or right by hydraulic rams or linear actuators designed to be capable of high rates of accelerations. Accelerations of this magnitude are necessary to generate the dynamic forces necessary to obtain the most realistic motion simulation. The seat units, together with their individual lateral linear actuators, are attached to a seat frame unit which is moved backward and forward by a separate hydraulic ram linear actuator.

The seat units move laterally and are bolted to Thompson-style linear bearings riding on hardened steel rails. These rails are attached to the frame unit which is moved forward and backward by a fourth hydraulic ram attached to a main or base platform.

The seat frame unit rolls forward and backward at the same high rate of speed as the seats move laterally. This frame unit for the seats is mounted on high speed high durometer neoprene casters of the type used on roller coasters that are designed to absorb constantly changing and uneven lateral loads. Preferably, the frame units are constructed of a high strength alloy or composite constructed as lightweight as possible to achieve the highest rates of acceleration using the lease amount of energy to reverse direction and drive the frame in the desired direction at the appropriately high speed.

The main or underlying frame is a vertically moving unit which can move up and down or be tilted laterally or longitudinally and combinations thereof.

It is moved vertically up and down by three hydraulic rams spaced generally equidistantly around the perimeter of the underlying frame. Preferably there is one mounted on either side of the main frame towards the forefront, and a third is mounted centrally at the rear of the base frame. At each corner of this main frame is a hinged type of an articulated bracket securing the main frame to the underlying floor base. There is a universal coupling on top of the bracket and ram that secures them to the main frame and permits it to tilt and roll. These stabilizing bracket joints are mounted at forty-five degrees to the frame sides to resist rotational forces generated by the seat frame and individual seat movements and the base frame lateral stresses. The joints are attached to the large pillow block bearings at the base of the four corners at the base of the platform. The hydraulics are controlled by computer controlled valves that are familiar to those in this field.

One of the primary advantages of the present design, is that it can operate in spaces under fourteen feet in height in contrast to existing platforms which require extra large spaces up to twenty-five feet in height to accommodate the up and down, and tilting motions.

An important benefit of the main platform having free movement in 2 axis pitch (tilt)—roll is that it allows for a wide variety of realistic motion simulation; i.e. such as—simulating a boat hitting waves, riding on a cobble stone road, hitting pot holes, or bouncing down stairs. This would make particularly good use of Trumbull's motion simulation technology shown as U.S. Pat. No. 5,199,875, Trumbull. By moving the three main vertical lift cylinders in synchronism, or in opposition, a multitude of physical sensations can be induced.

The motion simulation platform of the present invention generally is used in a theatrical setting with a large fixed screen and projector located above and towards the rear of the motion platform.

The screen in preferably shaped in the form of a truncated section of a hemisphere as illustrated in U.S. Pat. No. 4,634,384, NEVES, ET AL, Jan. 6, 1987.

The purposes of this motion platform is to create the illusion that the passengers are seated in a rapidly traveling and maneuvering vehicle. This is accomplished by applying forces to the passengers in synchronism with a display of the projected image to fabricate gravitational sensations or onset cues of the movements being projected on the screen.

Thus, when the projected image simulates the concept, the vehicle is turning to the right hydraulic rams which are attached to the main platform tilt to the right, simultaneously the seat unit rams drive the seats in the same direction, i.e.; to the right of the unit to simulate the centrifugal forces resulting from the vehicle turning to the right. Also, in the image suggestive vehicle, accelerating and decelerating the main platform or lower tier ram tilt the seats up or down depending upon the direction to be simulated, and the seat frame or middle tier ram drives the seats forward or backward to simulate that acceleration force component.

One of the principal advantages of this hybrid design is that the onset cues can be programmed separately from programming the simulation of acceleration, deceleration and centrifugal forces. This allows for a greater refinement of the simulation than is possible on simulators that rely solely on pitching, yawing, and thrusting for it's force simulation, or for simulators that move strictly orthoginally, which can rely only on visual cues or revisions from the projection image to suggest onset motion cues. One of the most important advantages of the present invention is that the up and down rams of the main platform are attached and secured to the platform on the top surface of the outer edge of the platform which permits a lower profile simulator structure to be employed. This feature expands the number of locations in existing theaters in which the device may be employed without the extreme expense and inconvenience of remodeling or the new construction of suitable space to accommodate the simulator.

In this field one of the first successful simulators rides utilized was an airplane simulator adapted for "The Tour of the Universe" ride in Toronto, Canada, developed by Douglas Trumbull.

A second approach utilized a group of single seats attached to platforms which are attached to hydraulic rams or linear actuators that pitch and rock the seats according to preprocessed series of commands.

PRIOR ART

U.S. Pat. No. 5,071,352, Denne discloses a simulator mechanism for a capsule utilizing three hydraulic rams to change the position of the simulator operating plane. The actuators are pivotally coupled at separate points to the platform supporting the simulator. Two are positioned on either side on a line perpendicular to the longitudinal axis of both the base plane and the simulator plane. The third is positioned at one end of the longitudinal axis of the base plane. Restraining mechanism are in the form of A-Frames underneath the platform.

There is an extensive discussion of the prior art in this reference.

A cockpit simulator is suspended on three vertical rams is shown in U.S. Pat. No. 3,645,011 Callanen. The cockpit assembly for a flight simulator is also disclosed in U.S. Pat. No. 3,829,988, Burny.

In U.S. Pat. No. 4,753,596, Hart, et al, a unit is mounted on three equally spaced pivot platforms each having two rams joining spaced apart hinges supplemental longitudinally acceleration obtained by a means of a surge frame slopingly mounted on the main frame and independently operated by a means of a piston cylinder device and moved forward and back in respect to the frame.

In U.S. Pat. No. 4,874,162, Trumbull, et al, plurality of passenger holding frames, seat frames are moved in synchronism each by separate set of actuators. Passengers view a stationery screen. The passenger holding frame is pivoted up and down. A beam is supported only by two largely vertical actuators, while two pairs of wings or arms limit movement of the beam.

U.S. Pat. No. 5,018,973, Alet, et al, for further simulator arrangement. Check for one corresponding to the EPA reference also.

U.S. Pat. No. 4,879,849, Hollingsworth, III et al, assigned to Omni Films International, Inc. includes three coordinated components or sub-systems which includes the seats to convey eight directions of motions to a participant. The seats are accelerated in all three planes. See column 1 and 2 for discussion of the prior art here.

Trumbull et al, U.S. Pat. Nos. 4,874,162, 4,752,065, and 4,798,376 are all related to the same underlying application. U.S. Pat. No. 4,066,256, Trumbull, discloses the basic platform mounted on a tripod of hydraulically actuated cylinders that tilt and pitch and upon which individual stationary seats are mounted.

SUMMARY OF THE INVENTION

In accordance with the present invention, a realistic ride simulator is provided with a substantially lower height profile than ride simulators of its type developed up to this date. Due to its unique construction, the current simulator associated with film images provides the rider with onset cues and accelerated motions in all planes together with tilting and banking. It is thus able to provide the patron with the most realistic sensations of the simulated ride experience yet developed.

Because of the low profile, the device is able to be erected in many more existing building structures without the need for extensive structural modifications. It is approximately one and one half to two feet lower than any existing simulator. As indicated, however, it provides much more extensive complex motions and onset cues than any existing simulator of this type.

The structure comprises three stacked tiers of actuator platforms providing independently cued motion sensations and acceleration. The first, or lower tier, comprises a base platform of generally rectangular shape mounted pivotally and suspended on three vertically oriented hydraulic rams with depending articulated arms secured to the top surface of the platform at the forward end of and the two opposed sides, and a third, centrally located on the rear edge of the base platform. Since the articulated arms of the hydraulic rams are secured to the top surface of the base platform, a significant amount of height is conserved by eliminating the necessity of mounting the hydraulic rams under the base platform. With appropriate programming known to the art, these rams may impart pitch and roll to the platform up to at least 20 degrees as well as up and down motions and combinations thereof that is a downward tilt to the right and upper tilt to the right and/or left, etc. At each of the four corners of the base platform, a heavy duty articulated scissor brace is secured by a Heim or Cardian type universal joint to the underside of the base platform. Such joints are shown in U.S. Pat. No. 5,018,973, Alet et al. These are extremely strong joints that scissor or elbow up and down and resist heavy lateral stresses. These hinged braces are essential to absorb high stress forces generated by movements of the combined forces of the dynamic structure.

Running longitudinally in the center of the base platform is a rectangular recess in which a horizontal hydraulic ram is mounted which is secured to the secondary or middle layer by brackets. The secondary layer comprises a base seat platform structure and is mounted and carried on heavy duty roller coaster type casters which roll forward and back on the top surface of the base platform. It is also provided with heavy duty horizontal rollers that engage walls of said first tier to resist the lateral forces generated by the third tier of seats.

A plurality of rows of seat structures comprise the upper platform. Mounted on each base is a row of seats which are secured on pairs of parallel laterally running rails. These rails are engaged by linear bearings on the lower surfaces of seat structure. For each seat platform, there is a laterally mounted hydraulic ram which is secured to the seat base which on cue provides gravitational movement to the right or left for each row of seats moving synchronously together.

As indicated, each of these hydraulic rams is mounted within the base of a row of seats and therefore do not themselves add any additional height to the structure.

This is the same with the forward acceleration and deceleration ram which does not add to the overall height of the structure since it is mounted in the rectangular recess of the underlying base platform.

The hydraulic rams of each layer of the structure are capable of providing high rates of acceleration, thus imparting extremely realistic sensations to the rider that have not been attainable with previous ride simulators.

Thus the invention comprises a ride motion simulator comprising a first lower tier carried on at least three retractable and extensible legs secured to a base platform, the lower tier having support arms at edges thereof extending upwardly and outwardly a length approximately equal to the length which said legs may be extended. The upper ends of said arms are pivotally attached to upper ends of the legs. A middle tier is carried on said first tier and mounted thereto in a manner to allow forward and backward longitudinal motion of said second tier with respect to said first tier by ram means mounted at the rear of said first tier, and pivotally connected to the second tier. The second tier includes a plurality of seat supports. The seat supports have rail means running laterally on the tops. The tops also having actuating means mounted thereon with extensible and retractable means secured to the seats mounted on said base and capable of moving said seats left and right laterally. The motions of said second, and third tiers are actuable independently of each other. The first tier is moveable up and down, pitchable up and down, and tiltable right and left, and combinations thereof.

It is desirable that the structures be fabricated from metal alloys or composites strong enough to resist the stress imparted to the structure, but as light as prudently possible to obtain the desired degrees of acceleration and minimize the necessity of reinforcing floor structures in building in which the devices are erected.

BRIEF DESCRIPTION OF THE DRAWING

In the accompanying drawing which forms a part of this specification.

ILLUSTRATIVE SPECIFIC EMBODIMENT

Figure 1:
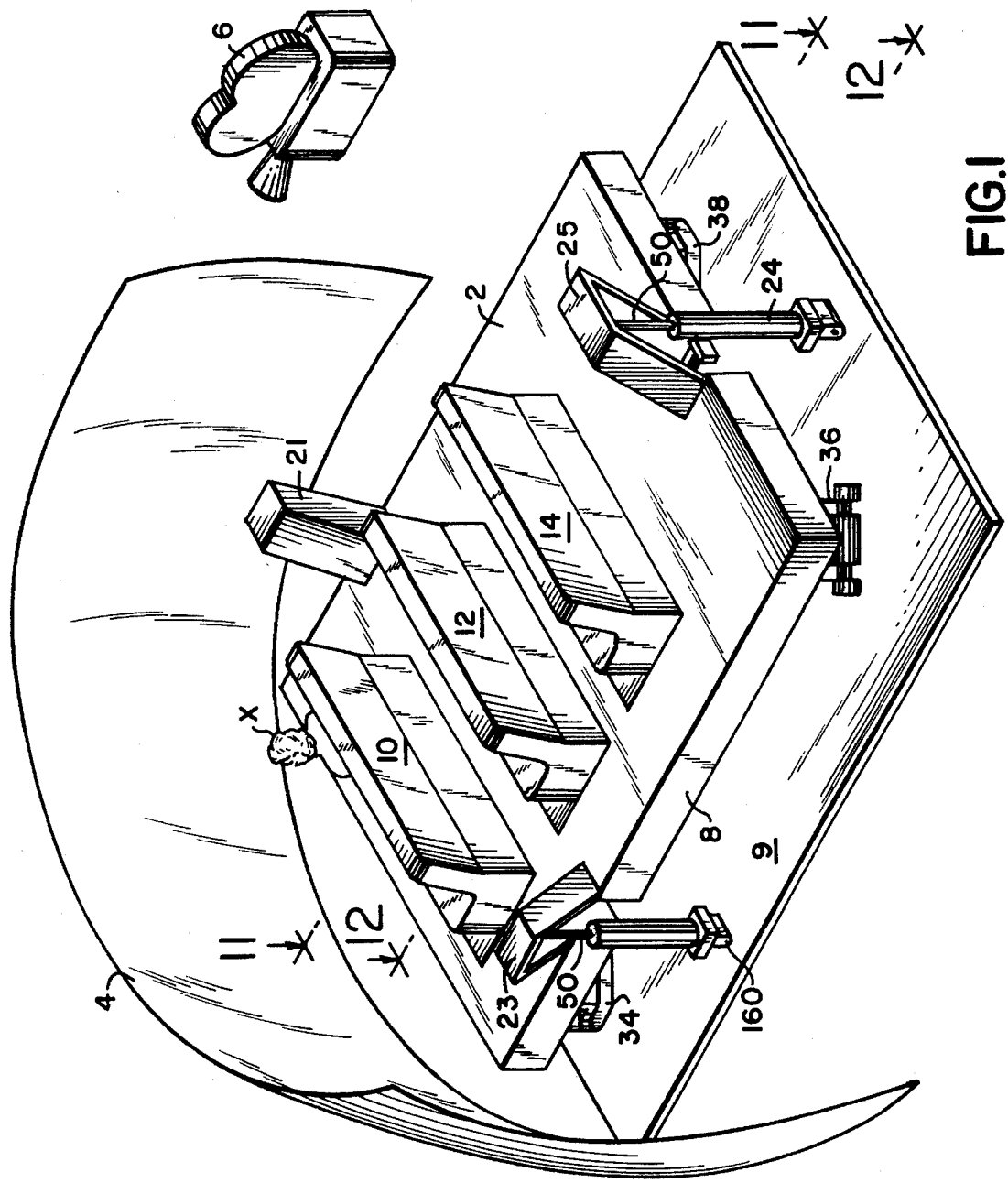
FIG. 1 is an overall perspective view of the apparatus of the present invention if placed in front of a viewing screen for images for a projector.
Figure 2:
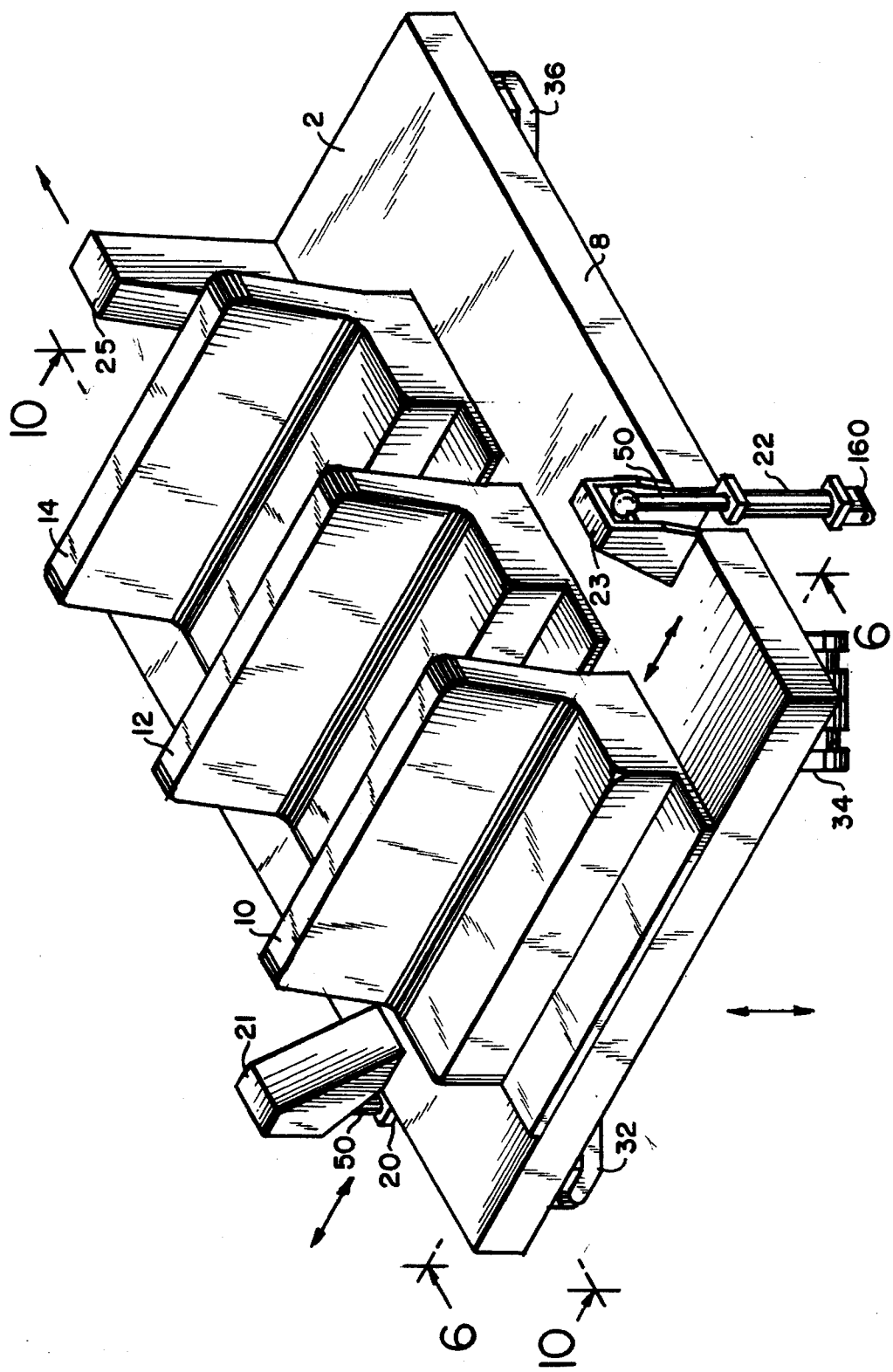
FIG. 2 is a perspective view of the apparatus itself with arrows indicating the motions along primary three alii.

Referring to the accompanying drawing in FIG. 1, the apparatus 2 of the present invention is shown positioned relative of a viewing screen 4 onto which the images are projected by a projector device 6. The apparatus 2 is comprised of a lower tier or a base platform 8. In the apparatus illustrated, three rows of rider's seats are shown at 10, 12 and 14 respectively, as the comprising upper tier 16.

The lower tier or base platform 8 is mounted on three vertical hydraulic rams 20, 22 and 24 secured to the floor 9. Rams 20 and 22 are mounted at the forward sides of platform 8 and ram 24 at the rear. The ends of pistons 50 in the rams 20, 22 and 24 are mounted within the upwardly and outwardly extending brackets 21, 23 and 25 secured to the framework of the first tier 8. The upper ends of pistons 50 these rams 20, 22, and 24 are tied into the tier 8 with universal joints 51 mounted on pins 53 in brackets 21, 23, and 25.

In each case, supporting brackets 21, 23 and 25 extend upwardly from the top surface of tier 8 with the upper ends of pistons 50 secured by universal joints. The hydraulic rams 20, 22 and 24 are approximately four feet long and the pistons 50 thereof may be extended or retracted approximately three feet.

Figure 3:
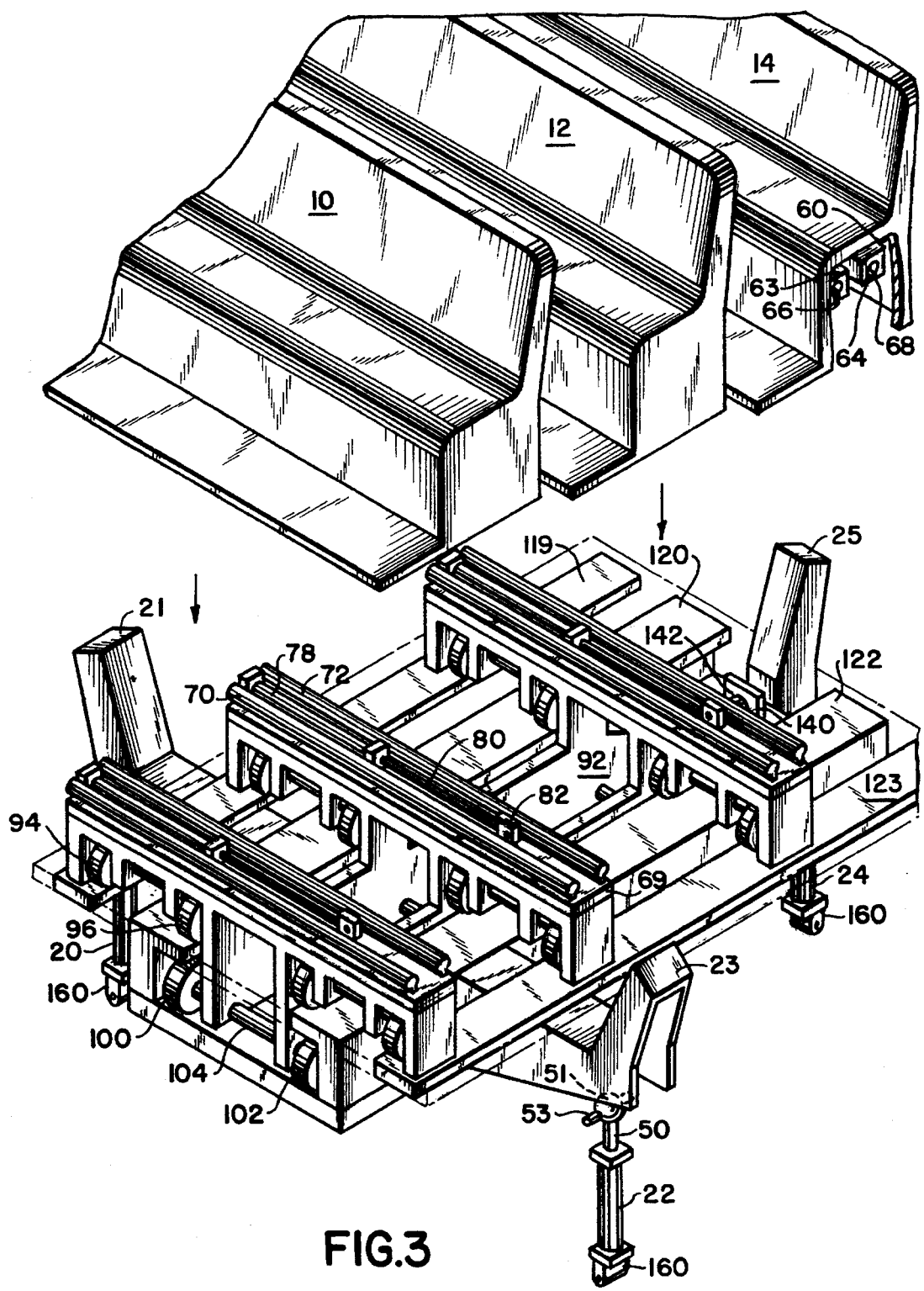
FIG. 3 is an expanded perspective exploded view showing the seat outer components removed from the seat base and showing the rails for mounting the seat components on, and part of the platform for forward and backward acceleration movement of the seat base.
Figure 4:
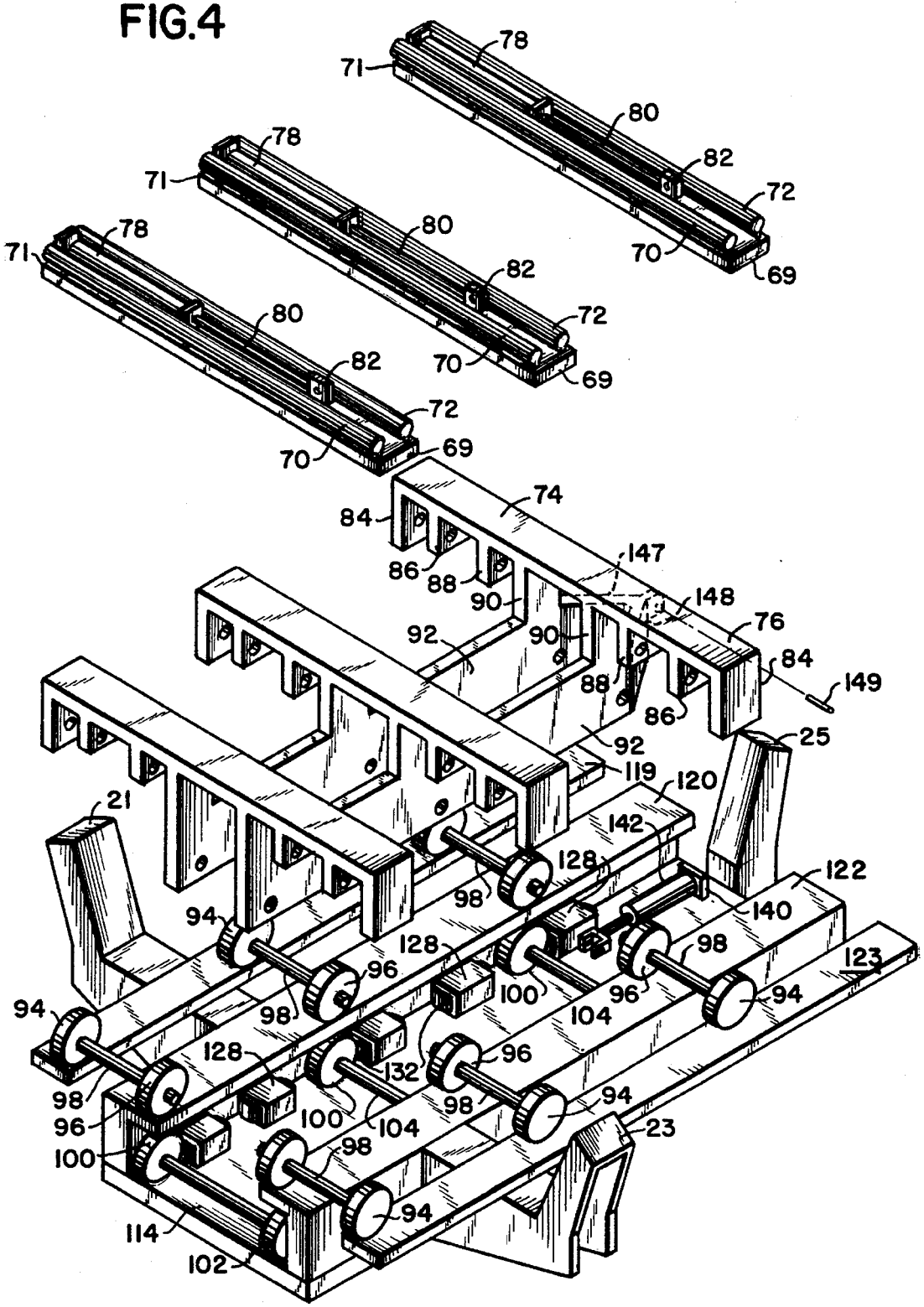
FIG. 4 is a further perspective exploded view showing the seat track rails, the bases removed from the underlying middle support tier; and the lower tier upper portion is shown.

In FIG. 3 the relationship of the lower tier or base platform 8 to the middle tier 54 and the seats 10, 12 and 14 is clearly shown.

The seats 10, 12 and 14 are formed of a very durable composite material and molded to the overall shape as shown.

The rear of the middle tier 54 framework is secured to the end of the piston 144 hydraulic ram 142 mounted longitudinally in front of the bracket fixture 25 at the rear of the device.

Figure 5:
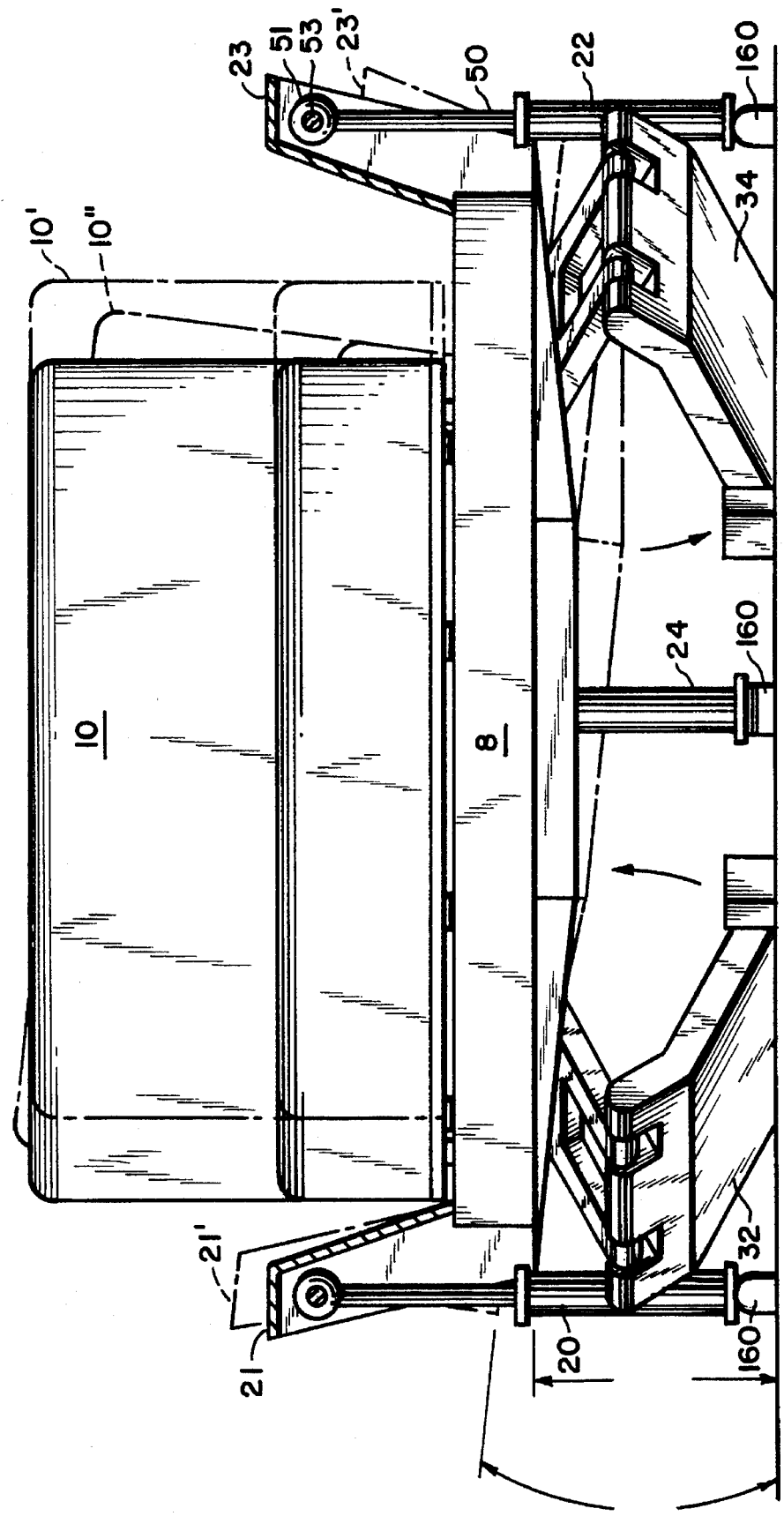
FIG. 5 is a front plan view and indicating the motions of the pillow block supports and the illustrating up and down motion of side rams of the first tier as well as relative movements of the seats laterally and a tilt of the lower tier.
Figure 6:
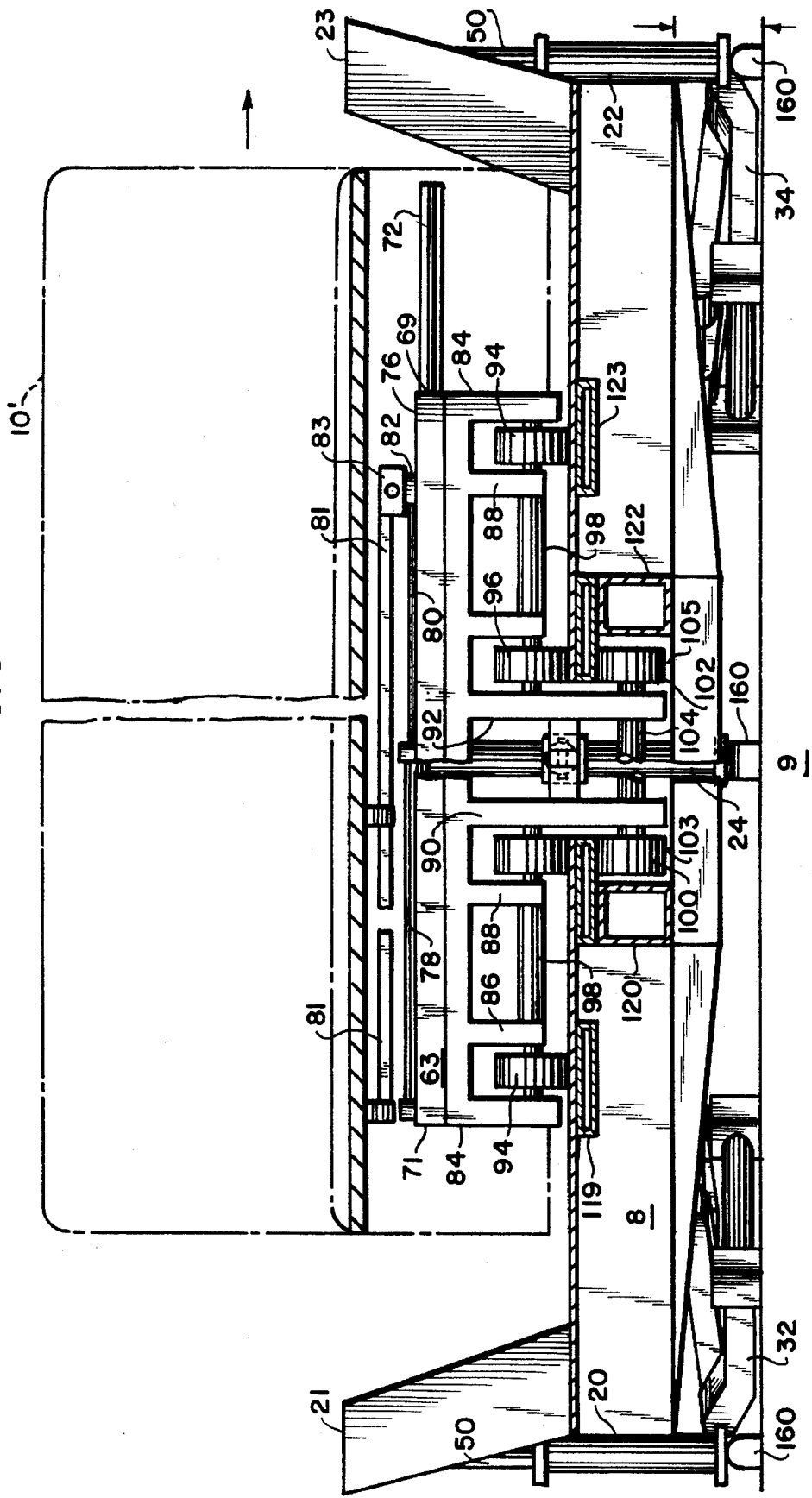
FIG. 6 is an enlarged view of the apparatus along lines 6—6 of FIG. 2 and illustrating the lower tier in its' lowermost position near the floor 9 and showing how the roller coaster wheels support the device in lateral and upward movement and how the respective tiers are tied in with each other.
Figure 7:
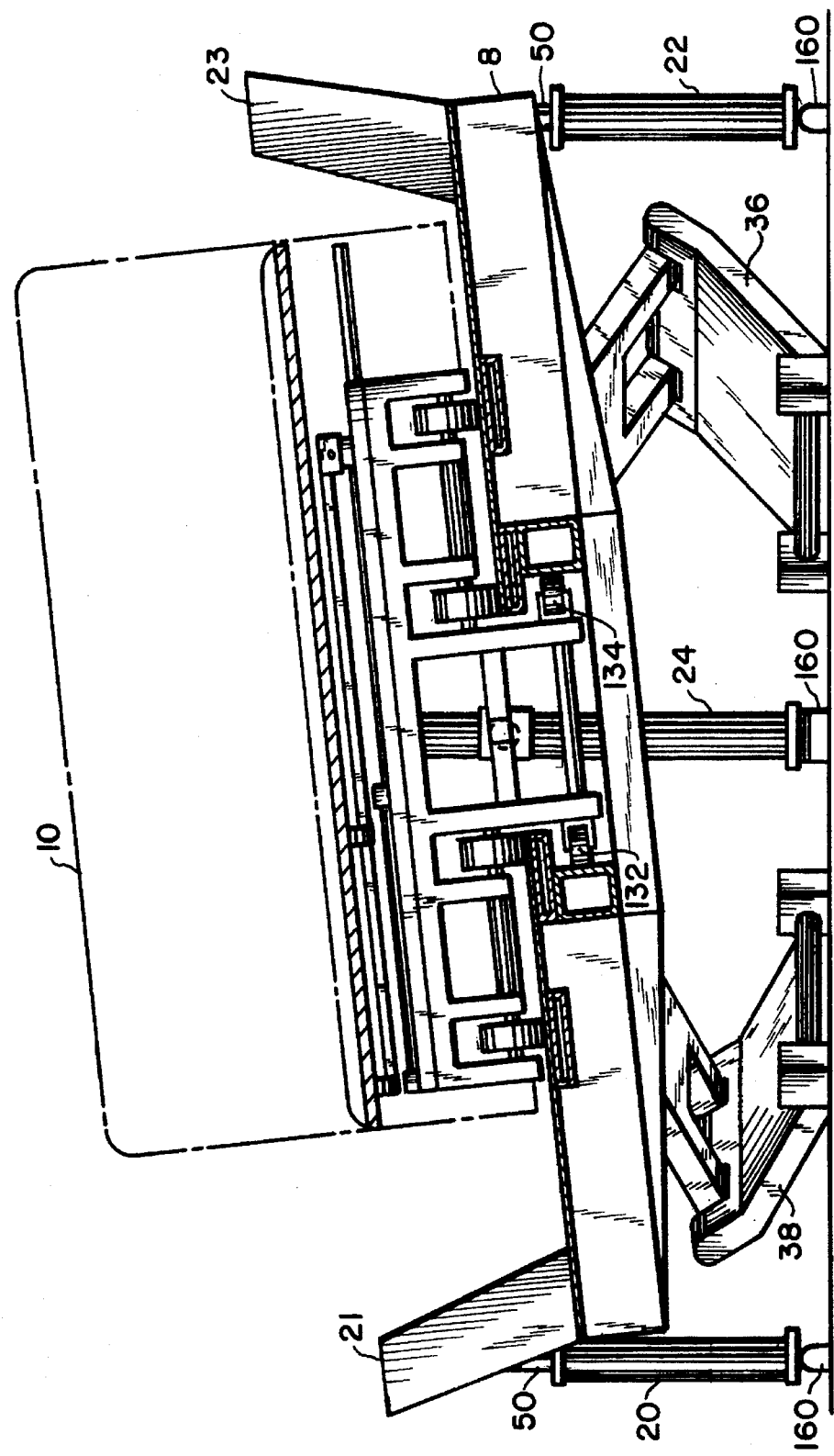
FIG. 7 is a view partially in section showing the lower tier being tilted to the right and the side rams being extended to drive the upper seat tier to the left.
Figure 8:
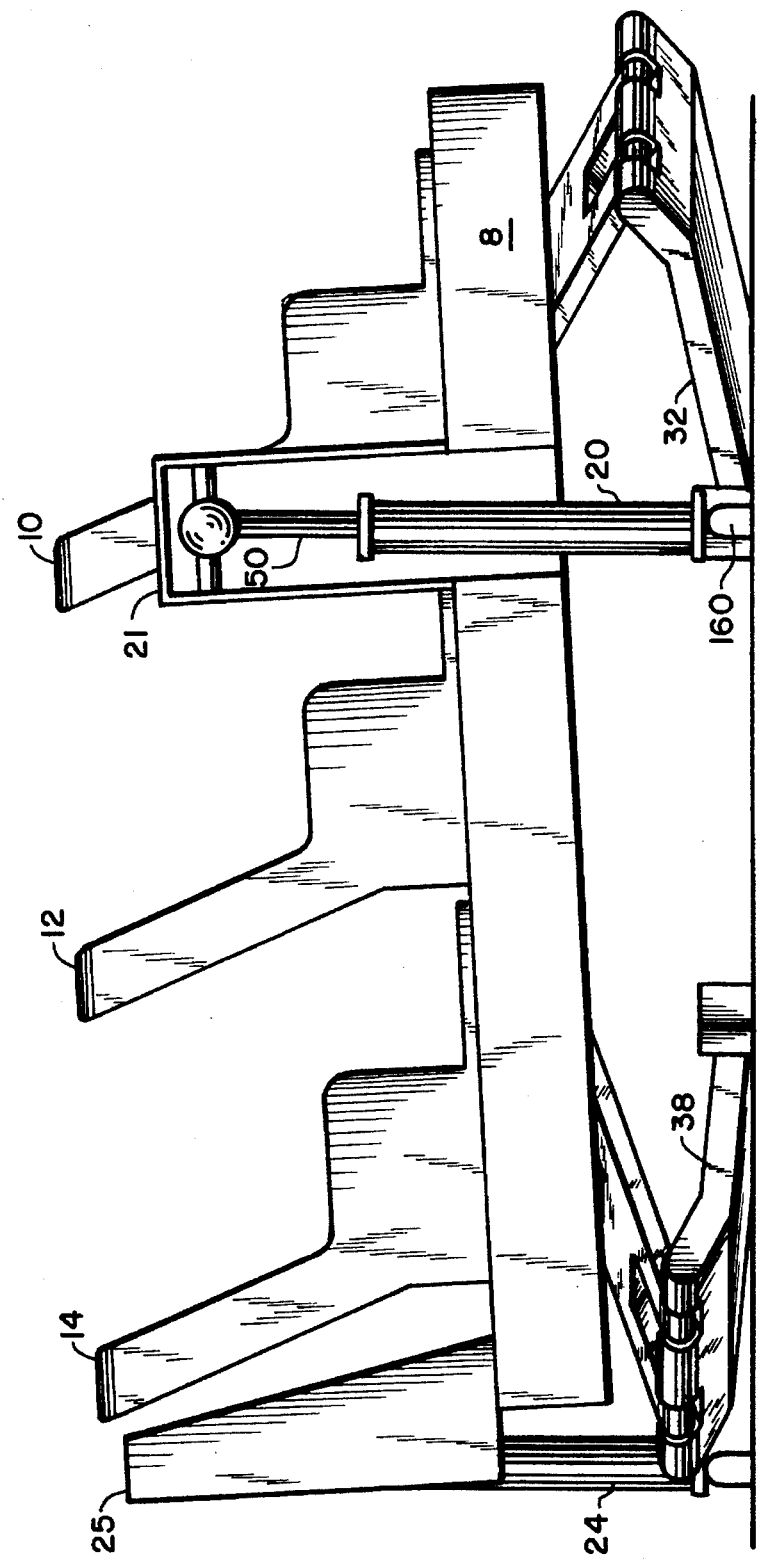
FIG. 8 is a side elevation view showing the apparatus with the lower tier pitching upward.
Figure 9:
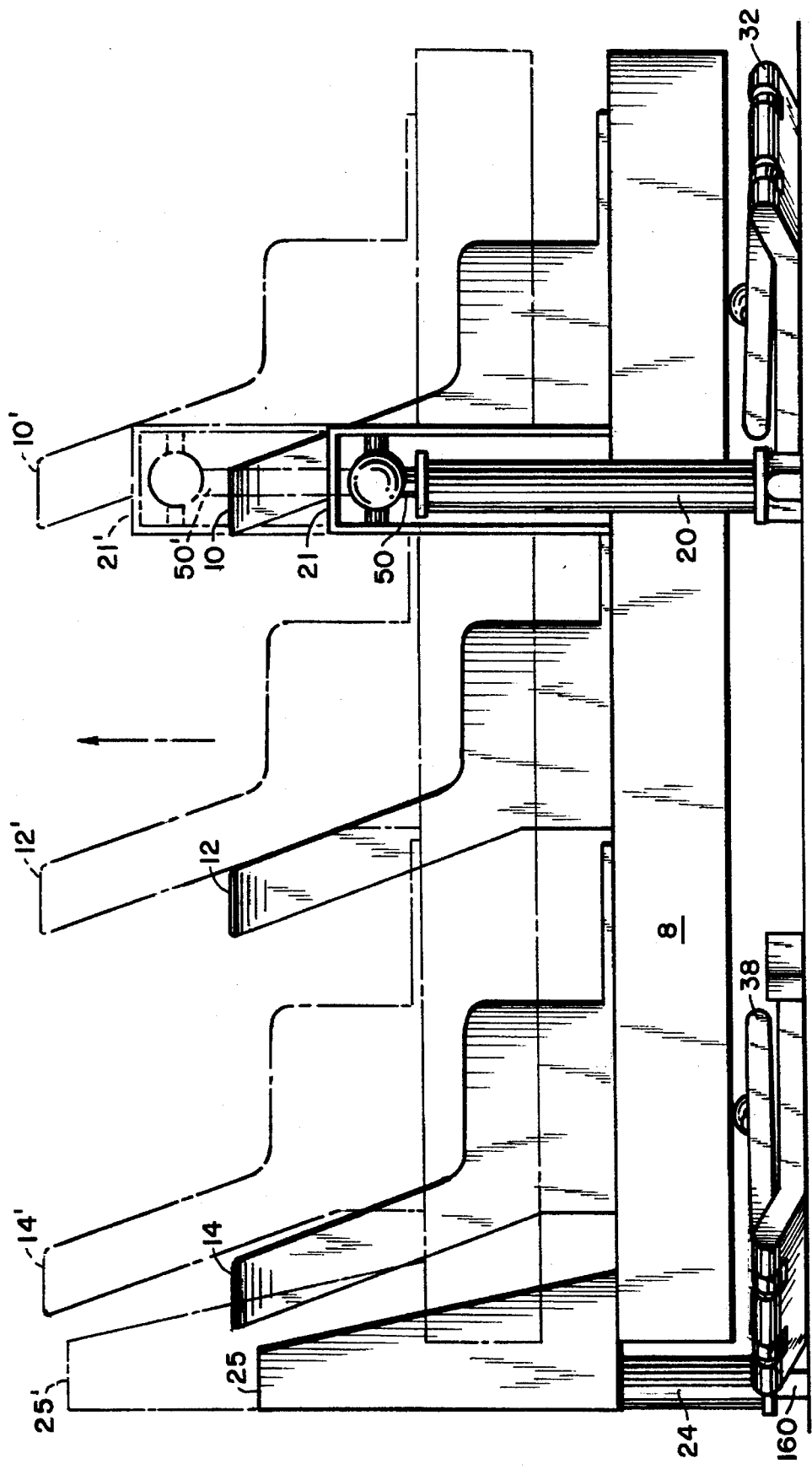
FIG. 9 is a side view of the apparatus partly in phantom showing the apparatus in a level lowered position in the solid lines and then extended upwardly and forwardly in the dotted lines.
Figure 10:
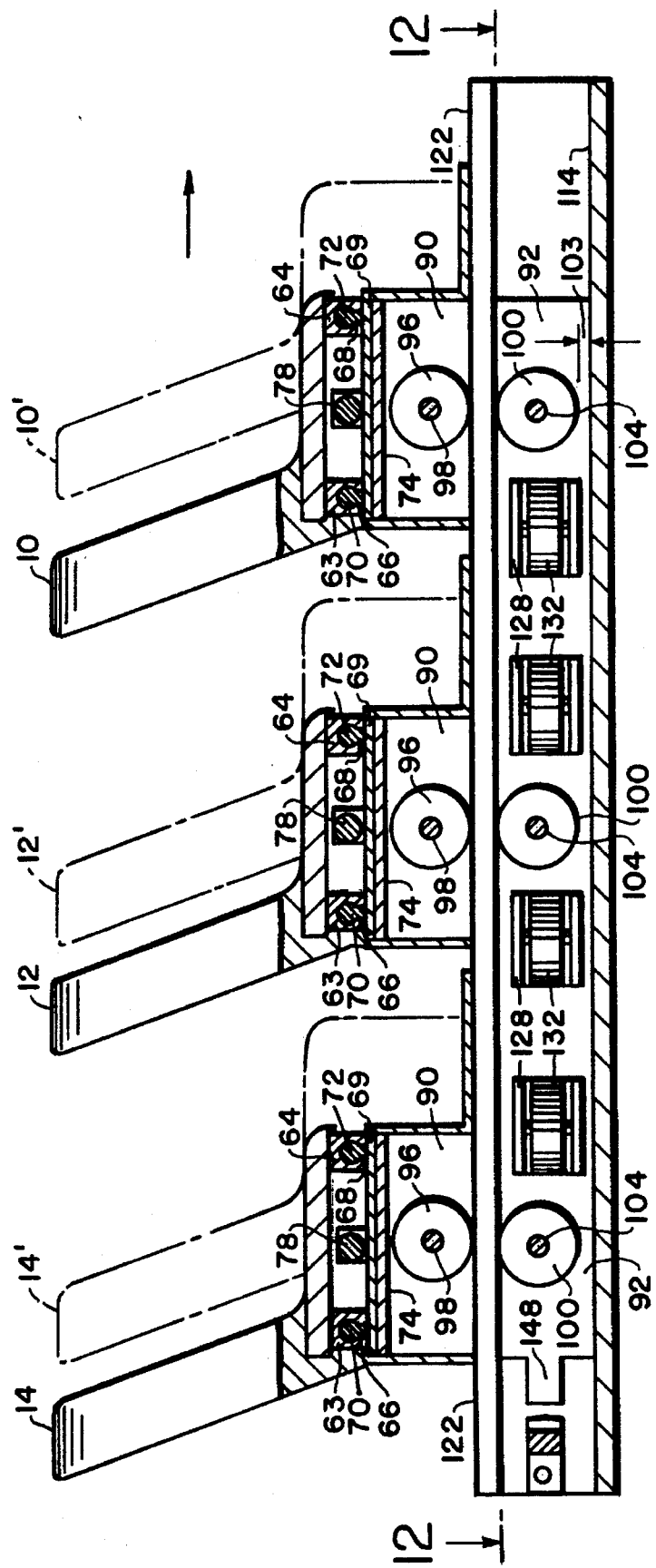
FIG. 10 is a sectional view along line 10—10 of FIG. 2 showing the mounting of the seat platform on tier 2 and illustrating the relative positions of the second tier and the seats moving forward with respect to the first tier and showing the mounting of the third tier of the seats on the second tier supports.

Shown in FIGS. 5, the pistons 50 extend upwardly and downwardly to raise and may tilt the platform 8 to the positions shown. The opposite tilt is indicated in FIG. 7 and also therein the seats 10, 12 and 14 are shown driven to the left when the device base 8 is tilted to the right in order to cue in a turn.

The underside 60 of the seat portion of the seat sections 10, 12, and 14 has linear bearings 66 and 68 in fixtures 23 and 24 which run the length of the seat and engage the tracks 70 and 72 mounted on the base 69 which in turn is mounted on the top surface 76 of the seat support framing 74. Also mounted between the rails 70 and 72 on the base 69 at one end 71 thereof is a hydraulic ram 78 with piston 80. A bracket 82 is secured at the end of the piston 80, and engages a corresponding linkage not shown on the underside 60 of the seat structures 10, 12, and 14. The hydraulic cylinder 78, together with the piston 80 extending in and out move the respective seats 10, 12 and 14 laterally upon a cue command.

The seat base framework 76 has extending downwardly therefrom, frame legs 84 on the outer sides which are longer than the intermediate legs 86 and 88 on each side. Central legs 90 extend downwardly and are formed into a longitudinal beam 92. Each seat base 76 is tied to the beam 92 by the frames 90 to comprise a unifying framework for the seat structures.

Bearings extending through the downwardly depending legs 84 through 90 axle 98 carry high durometer rubber casters 94 and 96 respectively which ride between the depending legs 84 and 86, and 88 and 90 respectively on each side of the apparatus. The caster wheels 94 and 96 ride on beams forming part of the lower tier 8. The central beams 92 extend downwardly into the recess in the lower tier section 8. The axle 104 carries heavy duty rollers 100 and 102 respectively under each seat structure 76 and are mounted on the lower portion of frames 92.

Secured to the outer sides of the frames 92 are fixtures 128 for side casters 132 which bear against the double upwardly extending sidewalls 116 and 118 of the lower tier 8. The base of the recess is lateral piece 114. Extending inwardly from the tops of the walls 116 and 118 are surfaces 120 and 122 on which the rollers 96 ride The caster wheels 132 serve to absorb side stress.

Figure 11:
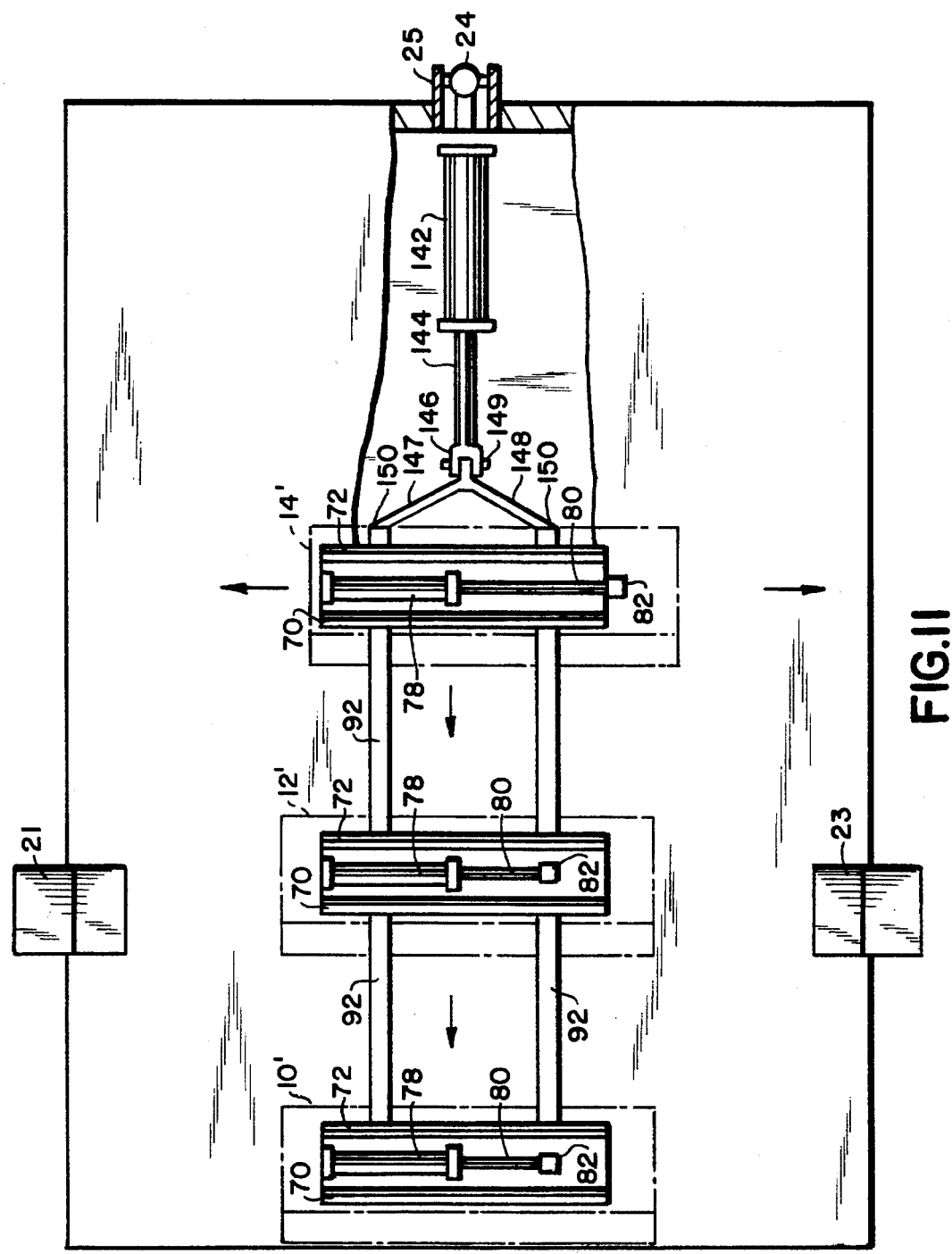
FIG. 11 is a top view taken along lines 11—11 of FIG. 1 with the seat covers having been removed and showing the accelerating rams of the third tier seats, with the deck partially cut away to show the respective action of the rear accelerating ram of tier two pushing the seat bases forward, and illustrating the relative positions of the seats and seat rams, one of them shown being driven sideways, the seats moving laterally, synchronously when in operation.
Figure 12:
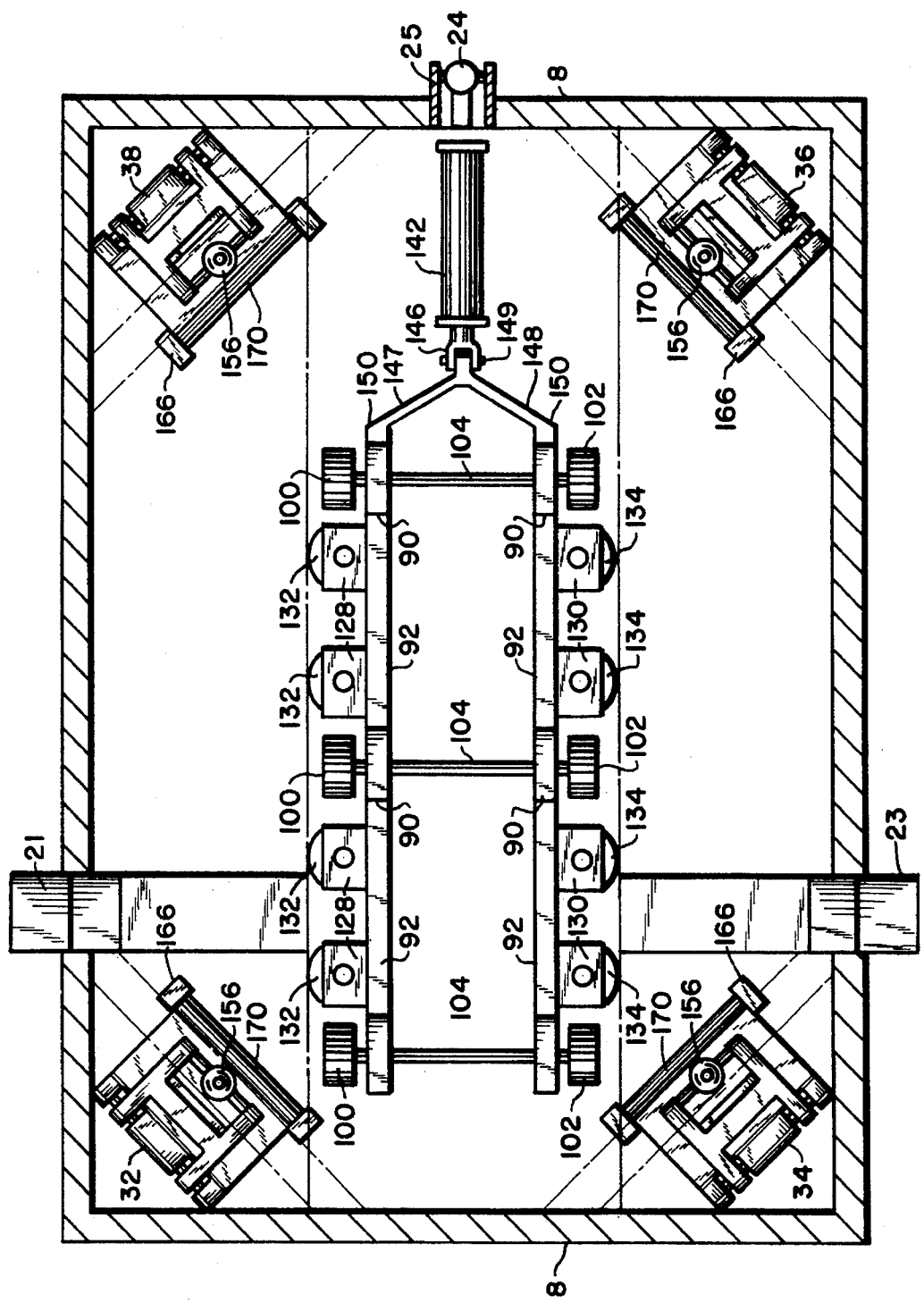
FIG. 12 is a sectional view along lines 12—12 of FIG. 1 showing how the support framework of tier 2 is tied to the accelerating ram at the rear of the device and showing the respective positions of the supporting pillow block brackets underneath tier one.

The forward and backward acceleration motion is obtained by the action of the ram 142 and the piston 144 and is mounted axially at the rear of the section of the base 8 as shown in FIGS. 11 and 12. The outer end of the piston 144 is fitted with a bracket 146 or Y bar mounted on pins 149 with arms 147 and 148 which are secured to the inner sides 150 of the rear of the longitudinal frame pieces 92 to drive the seat base 74 forward and backward.

Figures 13, 14:
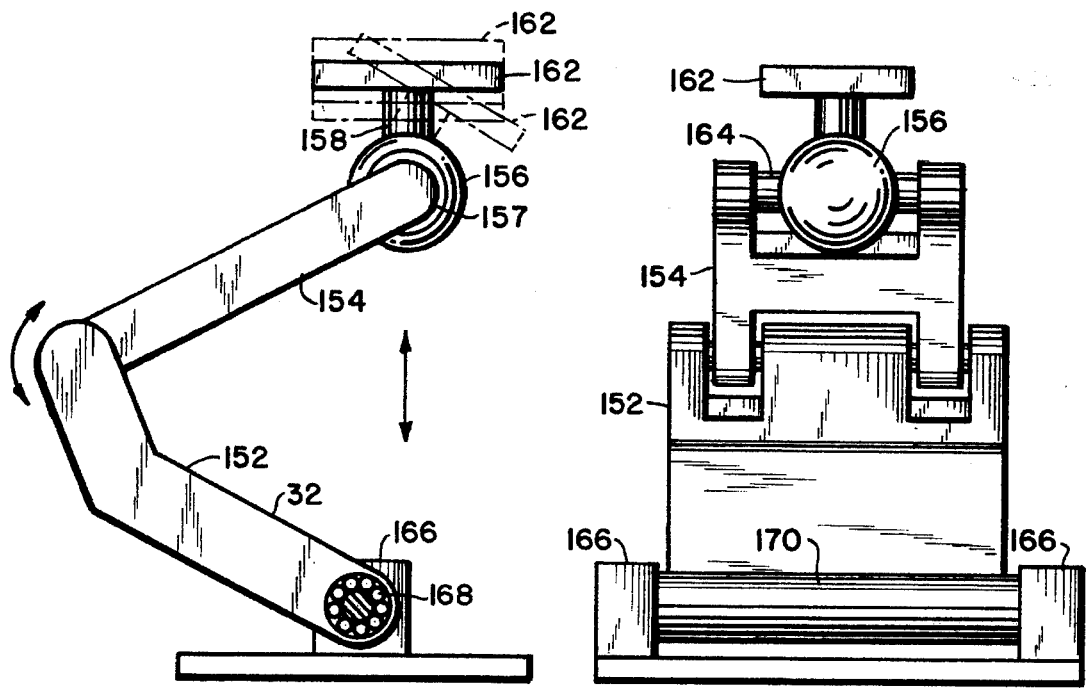
FIG. 13 is a side view showing the action of the pillow block support.
FIG. 14 is an end view thereof.
Figure 15:
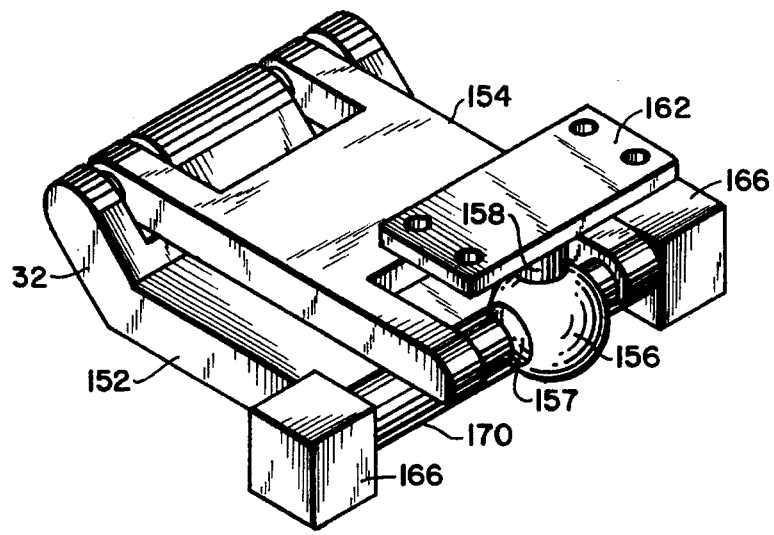
FIG. 15 is a perspective view of the pillow block support bracket in a lowered position.

One of the scissor brackets 32 secured to the pillow block 166 is shown in FIGS. 13–15 and comprises the lower pivoted arm 152 secured in bearings 168 and the blocks 166 which is pivoted at 164 to the upper arm 154 which is added in the arm bearing secure to the arm bearing 156 with extension thereof 158 secured to the flat plate 162 which in turn is mounted on the bottom of the base 8 on guides 180 shown in FIG. 12.

The device of the present invention provides a significantly improved ride simulator that can be assembled in compact space and requires a much lower profile space than the simulators presently available because of the way in which the lower platform and middle platforms are designed. Further, since each tier of the three tiers can be provided with on set cues and accelerations independently of the other, a much more realistic ride sensation is available with more of the onset cues available from physical cues than relying upon visual image cues as in the instance of most currently operated ride simulators.

The programming of the cues, the means for operation and control of the actuators is known to the art and does not form part of the present invention.

While the invention has been described by reference to an illustrative embodiment, it is not intended that the novel device be limited thereby, but that modifications thereof are intended to be included as falling within the broad spirit and scope of the foregoing disclosure, the following claims and the appended drawings.

What is claimed is:

1. A ride motion simulator comprising a first lower tier carried on at least three retractable and extensible legs secured to a base platform, said tier having support arms at edges thereof extending upwardly and outwardly a length approximately equal to the length which said legs may be extended, upper ends of said arms pivotally attached to upper ends of said legs, a middle tier carried on said first tier and mounted thereto in a manner to allow forward and backward longitudinal motion of said second tier with respect to said first tier by means mounted at the rear of said first tier, and pivotally connected to said second tier, said second tier including a plurality of seat supports, said seat supports having rail means running laterally on the tops thereof, said tops also having actuating means mounted thereon with extensible and retractable means secured to the seats mounted on said base and capable of moving said seats left and right laterally, said motions of said second, and third tiers being actuable independently of each other, and said first tier moveable up and down, pitchable up and down, and tiltable right and left, and combinations thereof.

* * * * *